United States Patent
Huang et al.

(10) Patent No.: US 7,633,049 B1
(45) Date of Patent: Dec. 15, 2009

(54) PHOTOSENSITIVE CIRCUIT FOR DETECTING AN OBJECT HAVING A SWITCH UNIT RESPECTIVELY PROVIDING POSITIVE VOLTAGE AND NEGATIVE VOLTAGE OF A CAPACITANCE TO A COMPARISON UNIT AT A FIRST AND A SECOND TIME PERIOD

(75) Inventors: Cheng Chieh Huang, Taipei (TW); Jinn-Ann Kuo, Taipei County (TW)

(73) Assignee: Capella Microsystems (Taiwan), Ltd., Sindian (TW)

( * ) Notice: Subject to any disclaimer, the term of this patent is extended or adjusted under 35 U.S.C. 154(b) by 0 days.

(21) Appl. No.: 12/219,702

(22) Filed: Jul. 28, 2008

(51) Int. Cl.
*H01J 40/14* (2006.01)

(52) U.S. Cl. .................. 250/221; 250/214 R

(58) Field of Classification Search ............ 250/221, 250/559.38, 214 R, 214 AL, 214.1, 338.1; 455/78, 556.1, 560, 565; 340/555–557
See application file for complete search history.

(56) References Cited

U.S. PATENT DOCUMENTS 4,870,267 A * 9/1989 Beeckel ............... 250/222.1

* cited by examiner

*Primary Examiner*—Que T Le
(74) *Attorney, Agent, or Firm*—Bacon & Thomas, PLLC

(57) ABSTRACT

The present invention discloses a photosensitive circuit comprising a photosensitivity unit, a capacitance and a switch unit. The photosensitivity unit is capable of receiving a received light, and the capacitance is capable of storing a photoelectric current corresponding to the received light. The switch unit is used to respectively provide the positive voltage of the capacitance to a comparison unit at a first time period, and the negative voltage of the capacitance to a comparison unit at a second time period. The comparison unit outputs a detection value according to the positive voltage and the negative voltage of the capacitance, the detection value is related to the distance between an object and the photosensitive circuit. The present invention further disclose a photosensitive chip to drive a luminescent unit to provide a detective light. The photosensitive chip comprises a sampling clock generator, the ambient light sensor unit, a proximity sensor unit and a driving clock generator.

6 Claims, 9 Drawing Sheets

PHOTOSENSITIVE CIRCUIT FOR DETECTING AN OBJECT HAVING A SWITCH UNIT RESPECTIVELY PROVIDING POSITIVE VOLTAGE AND NEGATIVE VOLTAGE OF A CAPACITANCE TO A COMPARISON UNIT AT A FIRST AND A SECOND TIME PERIOD

FIELD OF THE INVENTION

The present invention relates to a photosensitive chip, more particular to a photosensitive chip capable of detecting the change of ambient light.

BACKGROUND OF THE INVENTION

The proximity sensor has been used on variety kind of electric appliance equipment, and its working principle is using a light emitting diode to send a distance detective light which is then reflected by an object and using a photosensitive diode to receive the reflected light so that the object nearby the proximity sensor can be detected. The proximity sensor is commonly applied to detect the paper edge for the printer, copy machines and FAX machines, or to substitute the switch machines of floor model such as a lamp, a urinary, and consumer goods, industry and automobile market, etc. Besides, it is well known that iPhone cell phone produced by Apple Corporation uses the proximity sensor to detect approach of the ear of user, while being hold to approach to the ears of the user, the iPhone cell phone will lock the touch panel according to the detect result of the proximity sensor for avoiding the mistake on the touch panel, and while the iPhone is apart from the ears of the user, the iPhone will unlock the touch panel according to the detect result of the proximity sensor.

The ambient light sensor unit is another optic device usually used on the cell phone, notebook, and copy machines. While being irradiated by different intensity of light, the semiconductor material is to product the different current intensity which can be used for detecting the ambient light differences. The ambient light sensor unit is applied to adjust the black light modules of the cell phones and the lap top computer for saving power. The ambient light sensor unit is also applied in the copy machines to control the scanner light precisely.

However, these two photosensitive sensors have similar designs and structures, but they may interfere with each other in application. The conventional electrical equipment comprises these two photosensitive sensors which are operated by independent systems. What is needed is to integrate these two photosensitive sensors we for light and multifunction electric equipment.

SUMMARY OF THE INVENTION

Therefore, one of objects of the present invention is to provide a photosensitive chip which integrates the proximity sensor and the ambient light sensor for higher performance.

To achieve to the above-mentioned objective, the present invention provide a photosensitive chip for driving a luminescent unit to provide a detective light, comprising a sampling clock generator unit, an ambient light sensor unit, a proximity sensor unit and a driving clock generator. The sampling clock generator unit is capable of providing first time period and a second time period. The ambient light sensor unit is capable of detecting an ambient light excepting at said second time period. The proximity sensor unit is capable of detecting the ambient light at the first time period, and sampling the detective light at said second time period. The driving clock generator is capable of driving the luminescent unit at the second time period.

Besides, the present invention further provides a photosensitive circuit for detecting an object, said photosensitive circuit. The photosensitive circuit comprises a photosensitivity unit, a capacitance, a comparison unit, a switch unit. The light unit is capable of receiving an ambient light. The capacitance is capable of storing a photoelectric current generated by the photosensitivity unit according to the ambient light. The switch unit is capable of respectively providing positive voltage of the capacitance to the comparison unit at a first time period and a negative voltage of the capacitance to the comparison unit at a second time period. The comparison unit outputs a detection value according to said positive voltage and the negative voltage a detection value, and the detection value is related to the distance between the object and the photosensitive circuit.

Besides, the present invention further provides a photo sensing method comprising the following steps. A photoelectric semiconductor capable of receiving a light and generating a photoelectric current according to the received light is provided. A capacitance is used to store the photoelectric current. The positive voltage of the capacitance is provided at a first time period. Finally, a variation of the received light is calculated based on a difference between the positive voltage and the negative voltage.

The present invention has some following advantages:
1. The photosensitive chip doesn't need an external processor for calculating the variation of the ambient light;
2. The photosensitive chip can save the requirement for the light emitting diode and the processor, so the volume of electric equipments using the photosensitive chip of the present invention can be reduced; and
3. The photosensitive chip can save the requirement for the light emitting diode and the processor, so the manufacturing cost can be reduced.

To make it easier for our examiner to understand the objective of the invention, its structure, innovative features, and performance, we use preferred embodiments together with the attached drawings for the detailed description of the invention.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of photosensitive chip, photosensitive circuit and photo sensing method.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
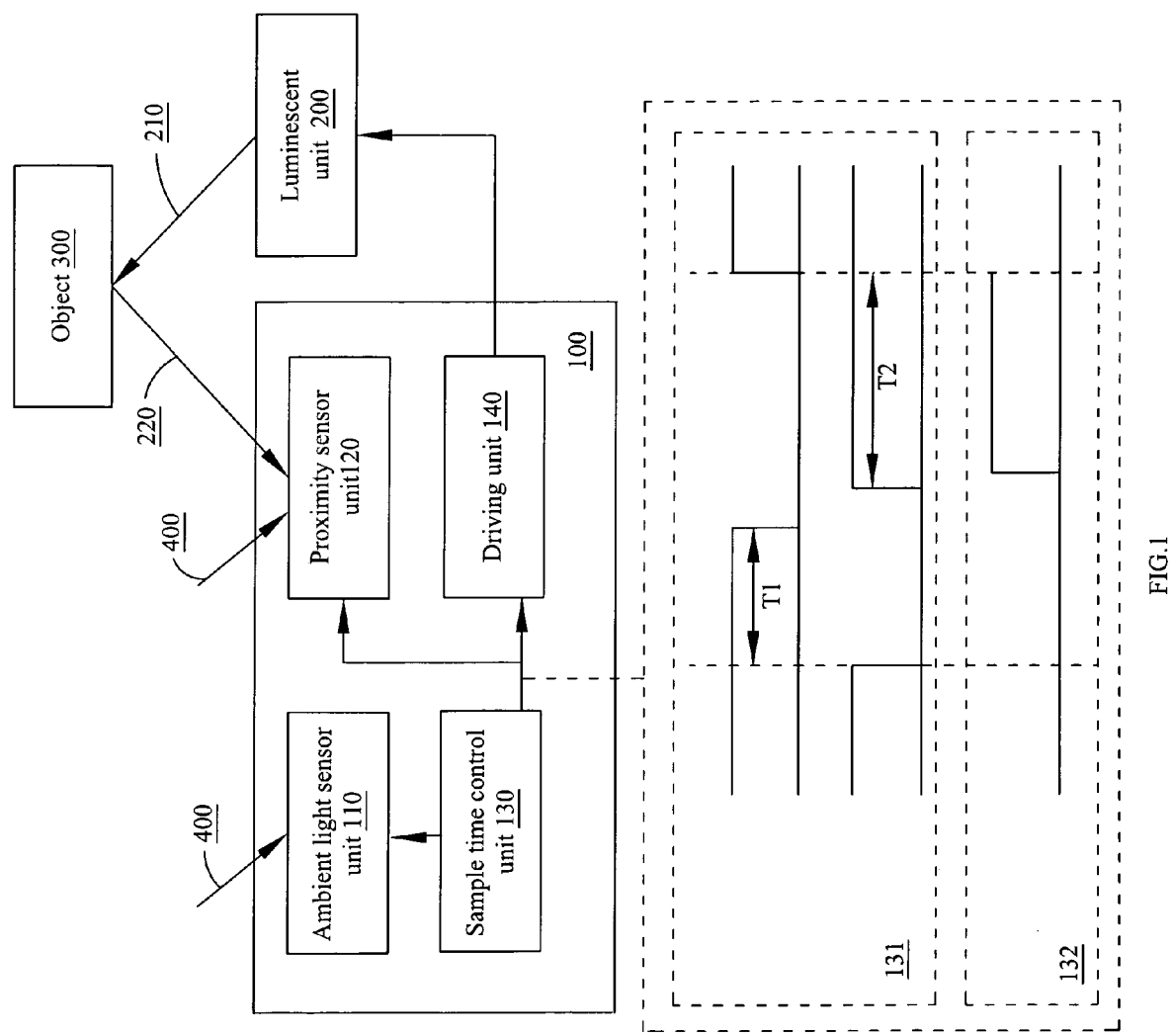
FIG. 1 is a block diagram of a photosensitive chip in accordance with the present invention.

FIG. 1 illustrates a block diagram of a photosensitive chip in accordance with the present invention. For making it easier for understanding, an object 300 and a luminescent unit 200 are also shown in FIG. 1. The photosensitive chip 100 is capable of driving the luminescent unit 200 to provide a detective light 210. A reflective light 220 is generated when the detective light 210 hits the surface of an object 300. The photosensitive chip 100 contains an ambient light sensor unit 110, a proximity sensor unit 120, a sampling clock generator unit 130 and a driving clock generator unit 140. The proximity sensor unit 120 is capable of receiving the reflective light 220 to further detect the distance of the photosensitive chip 100 between the object 300. The ambient light sensor unit 110 is capable of receiving an ambient light 400 to further adjust such as the brightness of the black light module of display panel or note book. However, the reflective light 220 usually interfere with the ambient light 400, and this may cause that the electric equipment has a mistake in detecting the intensity of the ambient light 400 when the proximity sensor unit 120 and the ambient light sensor unit 110 are integrated together.

Figure 2:
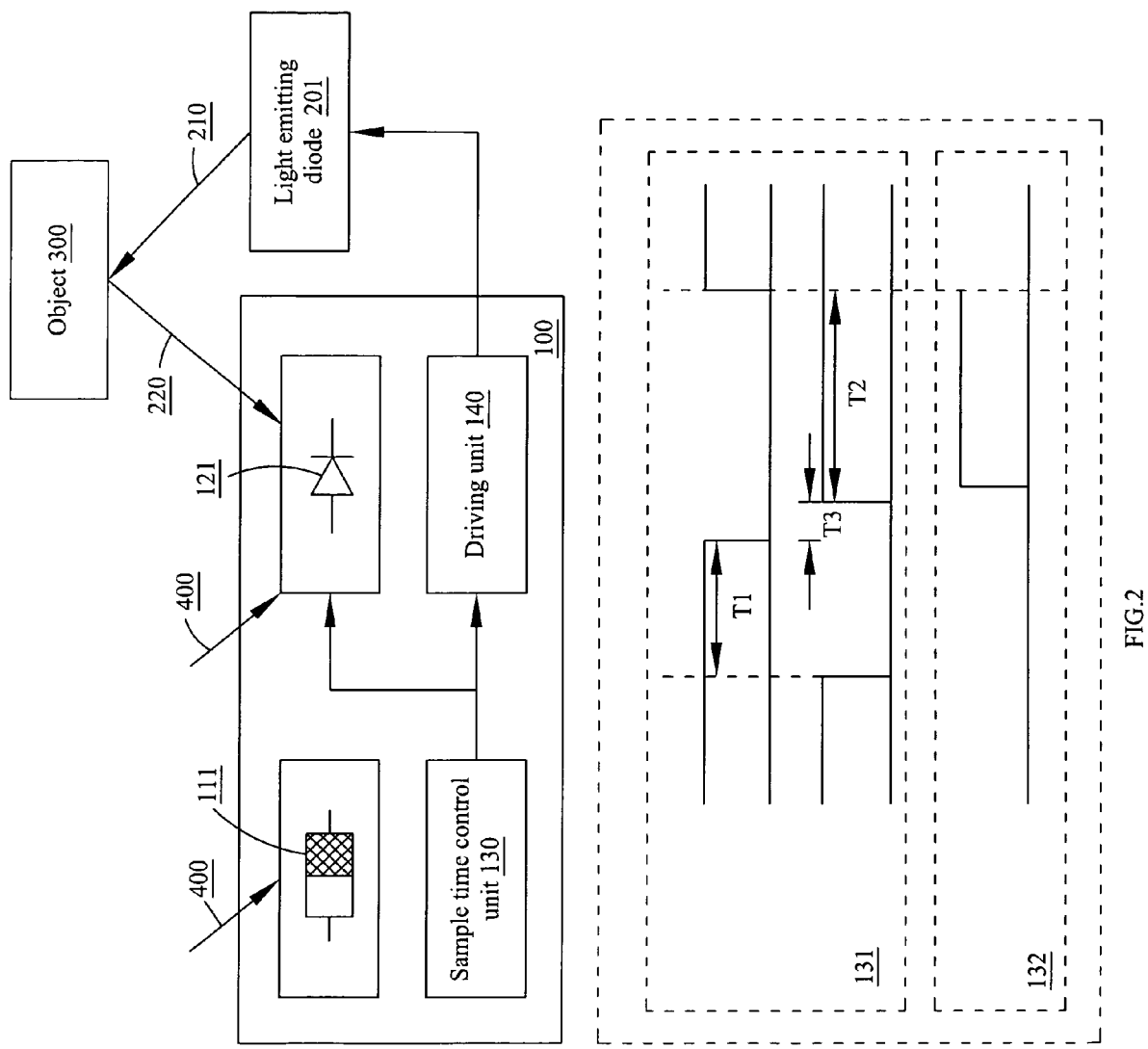
FIG. 2 is a schematic view of a preferred embodiment of a photosensitive chip in accordance with the present invention.

The sampling clock generator unit 130 is capable of providing a sampling time 131 which contains a first time period T1 and a second time period T2. The ambient sensor 110 is always sampling the ambient light 400 except at the second time period T2. The proximity sensor unit 120 respectively samples the ambient light 400 within the first time period T1, and the reflective light 220 within the second time period T2. The first time period T1 and the second time period T2 do not overlap to each other for avoiding the problem that the reflective light 220 interferes with the ambient light sensor unit 110. Besides, the sampling clock generator unit 130 can further define a driving time 132, so that the driving clock generator 140 can drive the luminescent unit 200 for providing the detective light 210 within the second time period T2 according to the driving time 132. Therefore, by properly setting the timing of providing the detective light 210, and sampling timing of the ambient light sensor unit 110 and the proximity sensor unit 120, the photosensitive chip 100 can avoid the problem that the reflective light interferes with the ambient light in prior art, FIG. 2 illustrates for a schematic view of a preferred embodiment of a photosensitive chip in accordance with the present invention. In the embodiment, the photosensitive chip 100 is preferred to be enveloped by a limpid material. Preferably, the ambient light sensor unit 110 is a photoelectric semiconductor 111. The photoelectric semiconductor 111 can generate the different leakage current under the different intensity of the ambient light 400, so it can be use to detect the intensity of ambient light 400. Preferably, the proximity sensor unit 120 is a photosensitivity diode 121 capable of receiving the detective light 210 with specific wavelength. Preferably, the luminescent unit 200 is a light emitting diode 201. For avoiding the reflective light 220 to interfere with the ambient light 400, the sampling time 131 contains a third time period T3 in this embodiment, third time period T3 is located between the first time period T1 and the second time period T2 for preventing the overlap of the first time period T1 and the second time period T2, and dividing the timing for driving the ambient light sensor unit 110 and the time point of the proximity sensor unit 120 in the sampling time 131.

Figure 3:
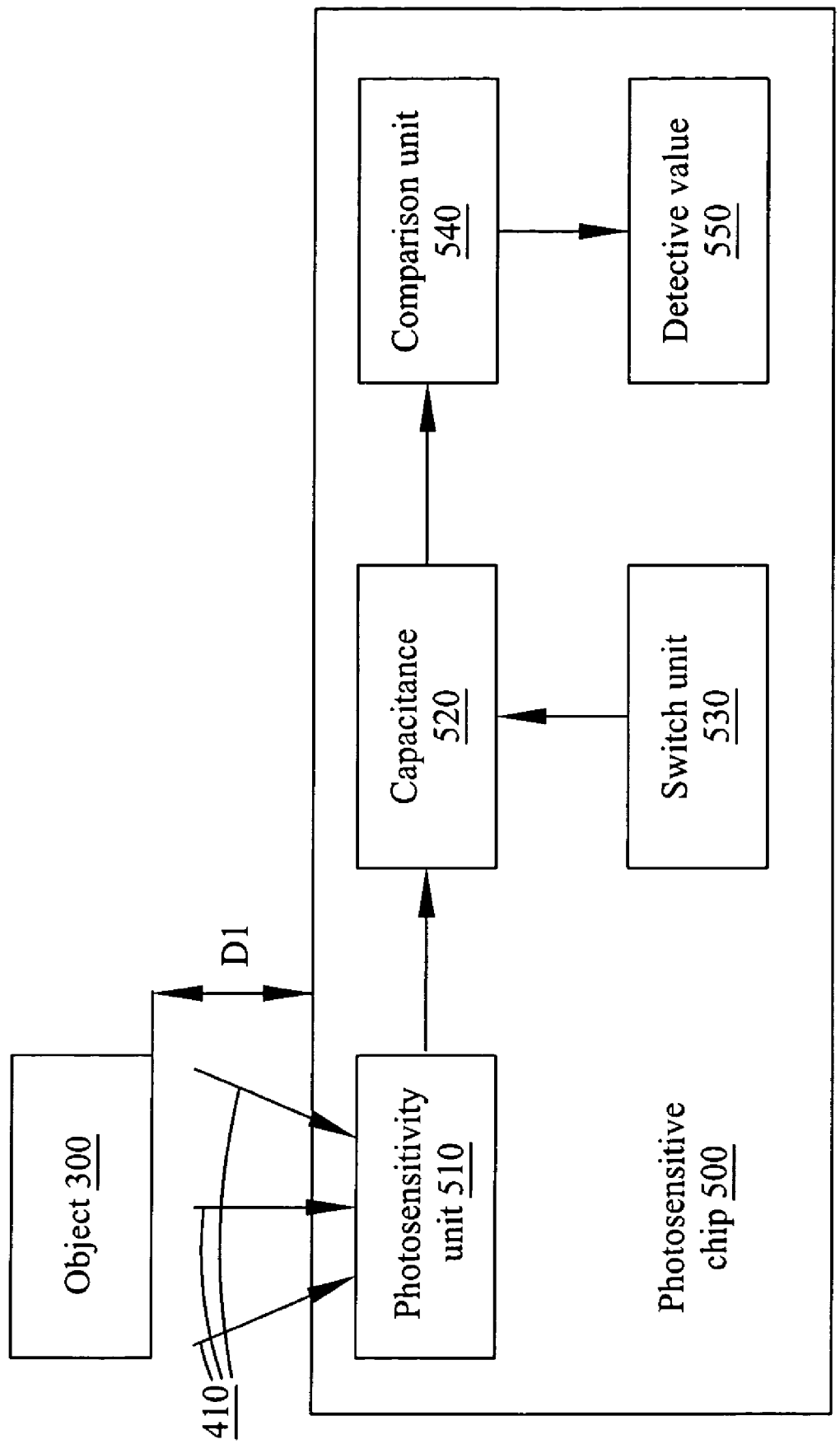
FIG. 3 is a function block diagram of a photosensitive circuit in accordance with the present invention.

FIG. 3 illustrates a function block diagram of a photosensitive circuit in accordance with the present invention. While an object 300 approaches the photosensitive circuit, the decrease of the distance D1 causes enhancement of the received light 410. In other words, the voltage caused by the ambient light 400 at the first time period T1 is canceled by itself at the second time period T2, and the reflective light 220 is still existed. Therefore, the voltage value represents the existence of the reflective light 220. The present invention of the photosensitive circuit 500 comprises a photosensitivity unit 510, a capacitance 520, a switch unit 530 and comparison unit 540. The photosensitivity unit 510 is capable of receiving the ambient light 410, and generating different intensity of electric current corresponding to different intensity of the received light 410 to charge the capacitance 520. The capacitance 520 stores the photoelectric current corresponding to the received light 410. In the photosensitive circuit 500, the switch unit 530 respectively provides the positive voltage of the capacitance 520 to comparison unit 540 within a first time period T1, and the negative voltage of the capacitance 520 to comparison unit 540 within a second time period T2. The comparison unit 540 then outputs a detection value 550 based on the positive voltage and the negative voltage. The detection value 550 is related to the distance between the object 300 and the photosensitive circuit 500.

Figure 4:
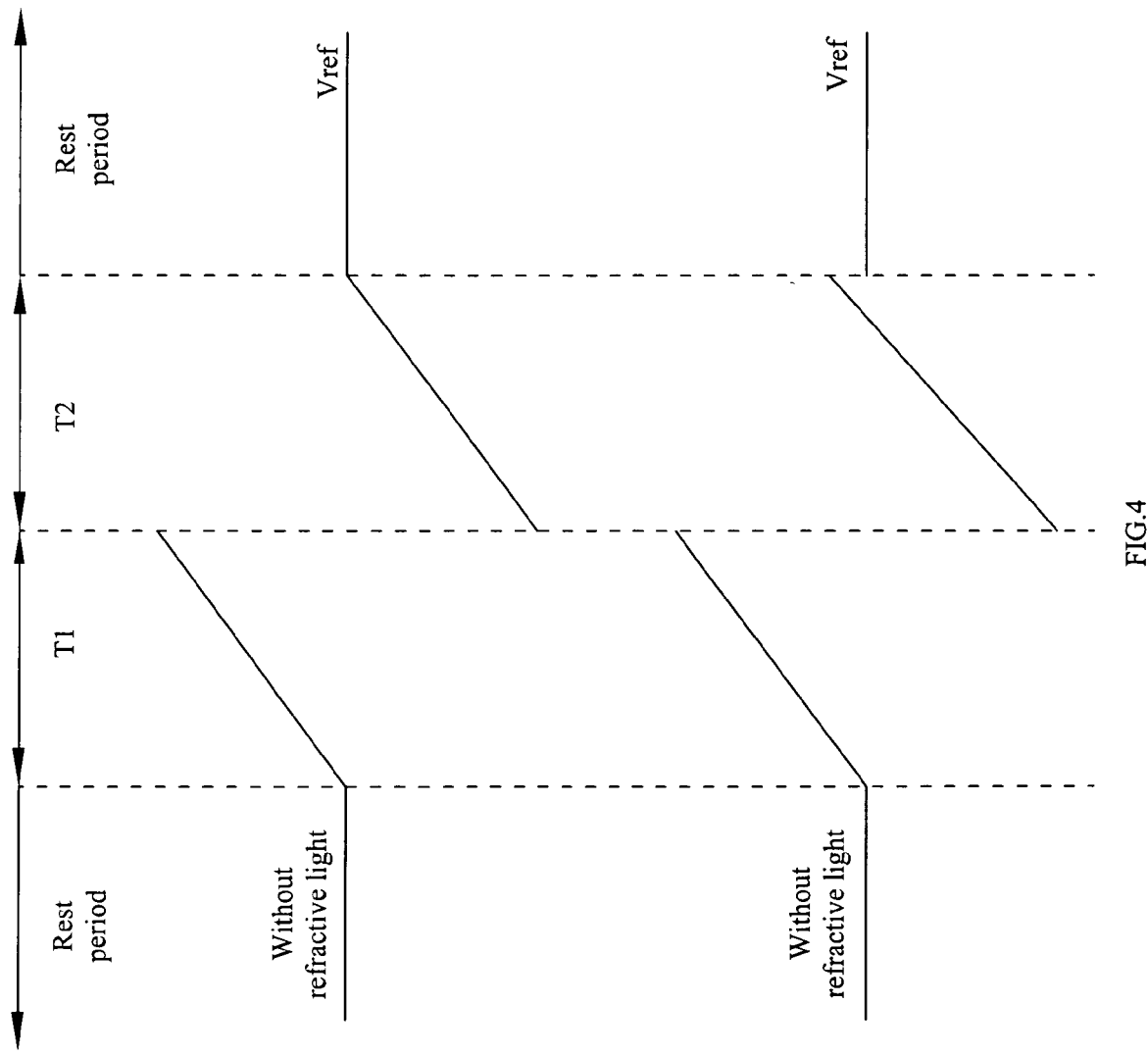
FIG. 4 is one waveform diagram of a preferred embodiment of a photosensitive circuit in accordance with the present invention.

FIG. 4 illustrates a schematic view of a preferred embodiment of a photosensitive circuit in accordance with the present invention. When the received light 410 is not change yet, it means that the object 300 is not close to or away from the photosensitive circuit 500, the capacitance 520 is charged by the photoelectric current which is generated by the photosensitivity unit 510 and corresponding to the intensity of the received light 410 within the first time period T1. The absolute voltage value of capacitance 520 increases and becomes larger than the reference voltage Vref. At the mean time, the switch unit 530 of the photosensitive circuit 500 reverses the polarity of the capacitance 520 within the second time period T2, so the capacitance 520 is then charged to the reference voltage Vref by the photoelectric current which is generated by the photosensitivity unit 510 and corresponding to the intensity of the received light 410 within the second time period T2. The comparison unit 540 receives the positive voltage and the negative voltage which are similar, so that the detection value 550 is close to the reference voltage Vref, this indicates that the received light 400 and the distance D1 are not changing.

However, when the received light 410 is changing, the intensity of the received light 410 is different in the first time period T1 and the second time period T2. The absolute voltage value of the capacitance 520 charged within first time period T1 and the second time period T2 are not similar, so the detection value 550 from comparison unit 540 deviates the reference voltage Vref to indicate the change of distance D1. For example, when the object is close to the photosensitive circuit 500, the detection value 550 is lager than the reference voltage Vref, and when the object is away from the photosensitive circuit 500, the detection value 550 is smaller than the reference voltage Vref.

It should be noted that in some situations, such as a sunshine day or even the light is harsh to the eye, the received light 410 is much higher than the detective light 210 provided by the luminescent unit 200, and the difference between the voltages which the photosensitive chip 500 obtained at the first time period T1 and the second time period T2 may therefore too small to be detected. In this situation, the switch unit 530 stops to provide the negative voltage of the capacitance 520 to the comparison unit 540 within the second time period T2. In other words, the photosensitive chip 500 stops the function of the photosensitivity unit 510 to prevent from being destroyed by the strong light when the received light 410 is too strong to cause the photoelectric current larger than a threshold value for the capacitance 520.

Figure 5:
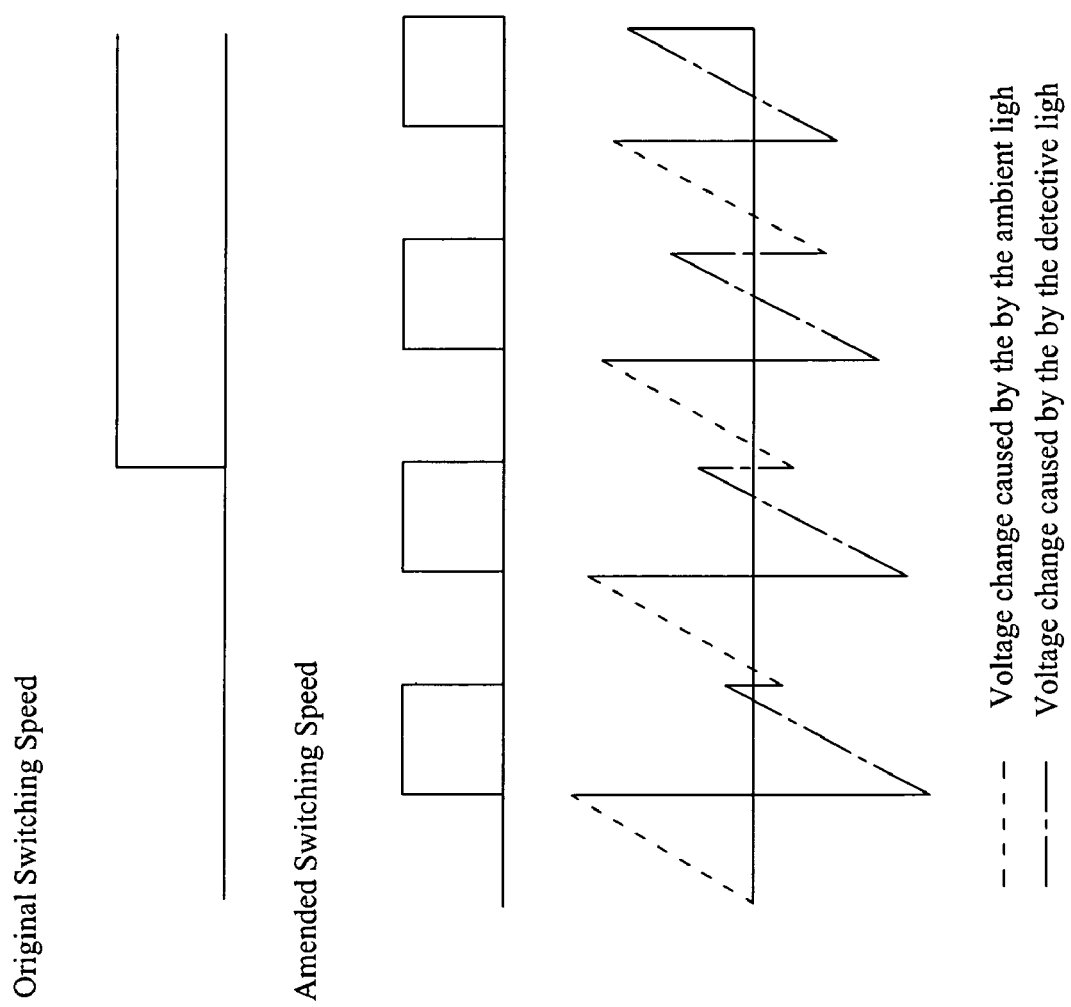
FIG. 5 is another waveform diagram of a preferred embodiment of a photosensitive circuit in accordance with the present invention.

FIG. 5 illustrates another waveform diagram of a preferred embodiment of a photosensitive circuit in accordance with the present invention. Although the received light 410 is much higher than the detective light 210 in the situation that the light is harsh to the eye, and both voltage values obtained at the first time period T1 and the second time period T2 are much higher than the threshold value of the capacitance 520 caused by that the capacitance 520 can not tolerance the total electrons of the photoelectric current, an embodiment disclosed in the present application still can solve the problem mentioned above and calculate the level of the high luminance received light 410. As shown in FIG. 5, the switch unit 530 switches the polarity of the capacitance 520 rapidly for generating a plurality of short-period first time period T1 and second time period T2 when the received light 410 is too strong to cause the photoelectric current larger than a threshold value for the capacitance 520. And therefore the electrons of the photoelectric current are wearied off when rotating the polarity of the capacitance 520 by the switch unit 530, and the difference value between the original first time period T1 and the original second time period T2 can be retained eventually.

Figure 6:
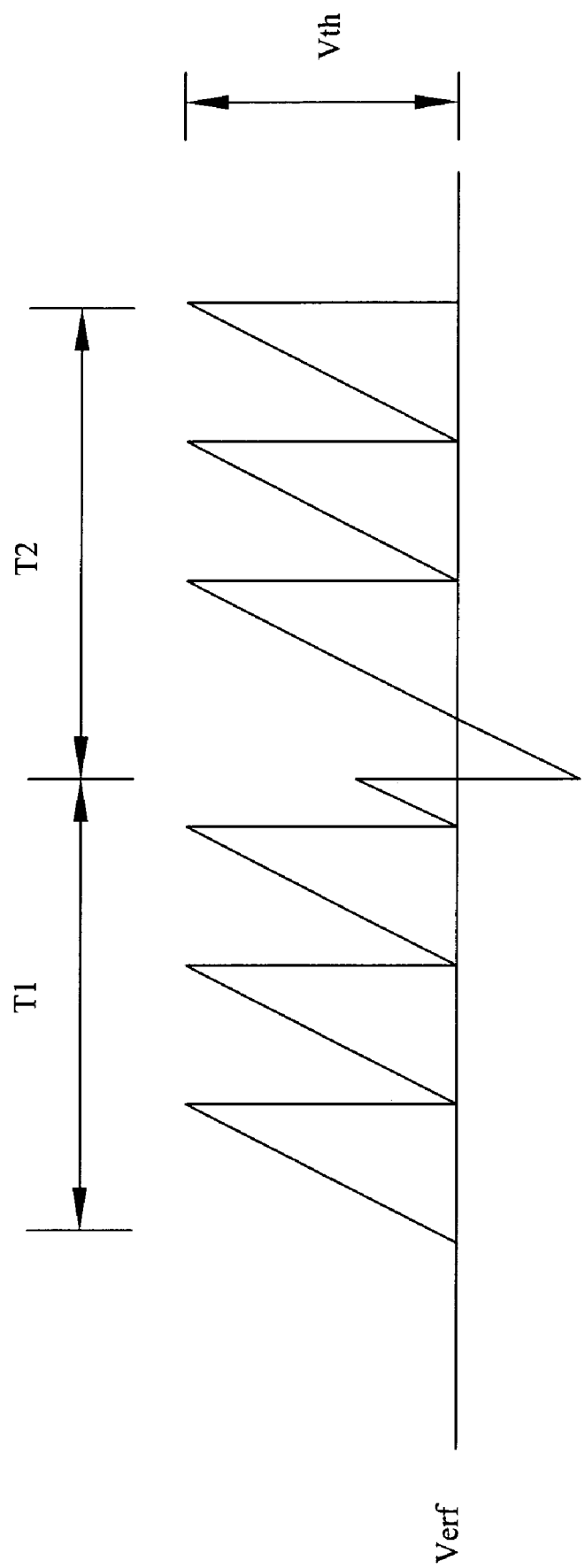
FIG. 6 is the other waveform diagram of a preferred embodiment of a photosensitive circuit in accordance with the present invention.

FIG. 6 illustrates the other waveform diagram of a preferred embodiment of a photosensitive circuit in accordance with the present invention. Although the received light 410 is much higher than the detective light 210 in the situation that the light is harsh to the eye, and both voltage values obtained at the first time period T1 and the second time period T2 are much higher than the threshold value of the capacitance 520 caused by that the capacitance 520 can not tolerance the total electrons of the photoelectric current, an embodiment disclosed in the present application still can solve the problem mentioned above and calculate the level of the high luminance received light 410. As shown in FIG. 6, the photosensitive circuit 500 repeatedly resets the voltage value of the capacitance 520 for making the capacitance 520 be able to tolerance the total electrons of the photoelectric current when the received light 410 is too strong to cause the photoelectric current larger than a threshold value Vth for the capacitance 520. In other words, once the voltage of the capacitance 520 is charged to a threshold value Vth by the photoelectric current caused from the received light 410, the photosensitive circuit 500 bypasses the capacitance 520 for releasing the electrons to reset the voltage value of the capacitance 520. The capacitance 520 can tolerate photoelectric current after being reset for the first number times within the first time period T1 and for the second number times within the second time period T2 respectively. Therefore, the photosensitive circuit 500 is capable of calculating the difference value between the first time period T1 and the second time period T2 in accordance with the threshold value Vth, the first number, the second number and the eventual value of the capacitance 520.

Figure 7:
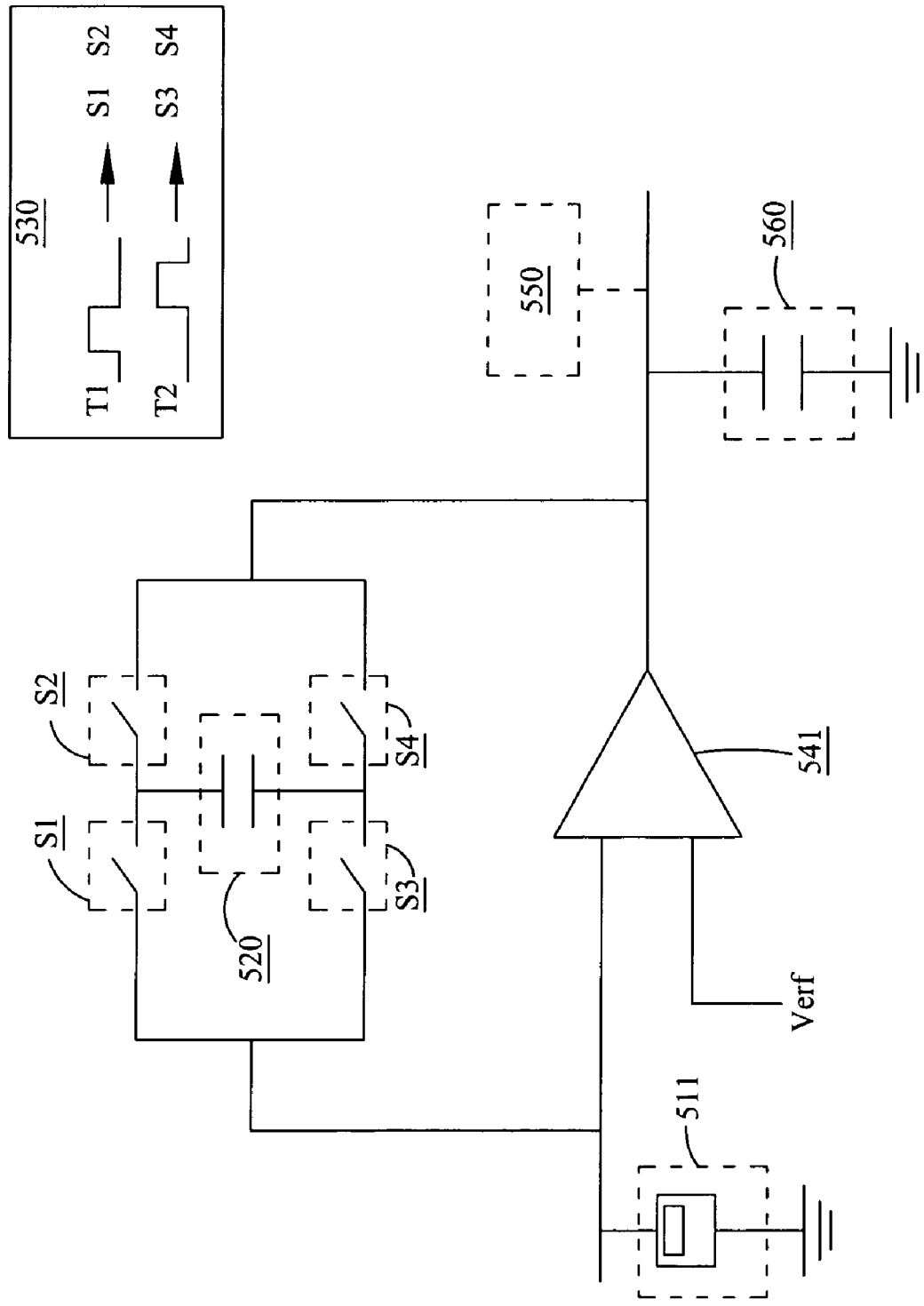
FIG. 7 is a schematic view of a preferred embodiment of a photosensitive chip in accordance with the present invention.

FIG. 7 illustrates a schematic view of a preferred embodiment of a photosensitive circuit in accordance with the present invention. In this embodiment, the photosensitivity unit 510 is a photoelectric semiconductor 511, and the comparison unit 540 is a comparator 541. The switch unit 530 is implemented by the first switch S1, the second switch S2, the third switch S3 and the forth switch S4 for reversing the capacitance 520. The switch unit 530 enables the first S1 and the forth switch S4, and disables the second switch S2 and the third switch S3 within the first time period T1, in order to reverse the capacitance 520. Preferably, the embodiment further comprises a latch unit for preserving the detection value 550. Therefore, the embodiment of present invention can calculate the variation of the ambient light of two different time without using processor, so that the variation of the distance between the photosensitive circuit 500 and an object can be obtained.

Figure 8:
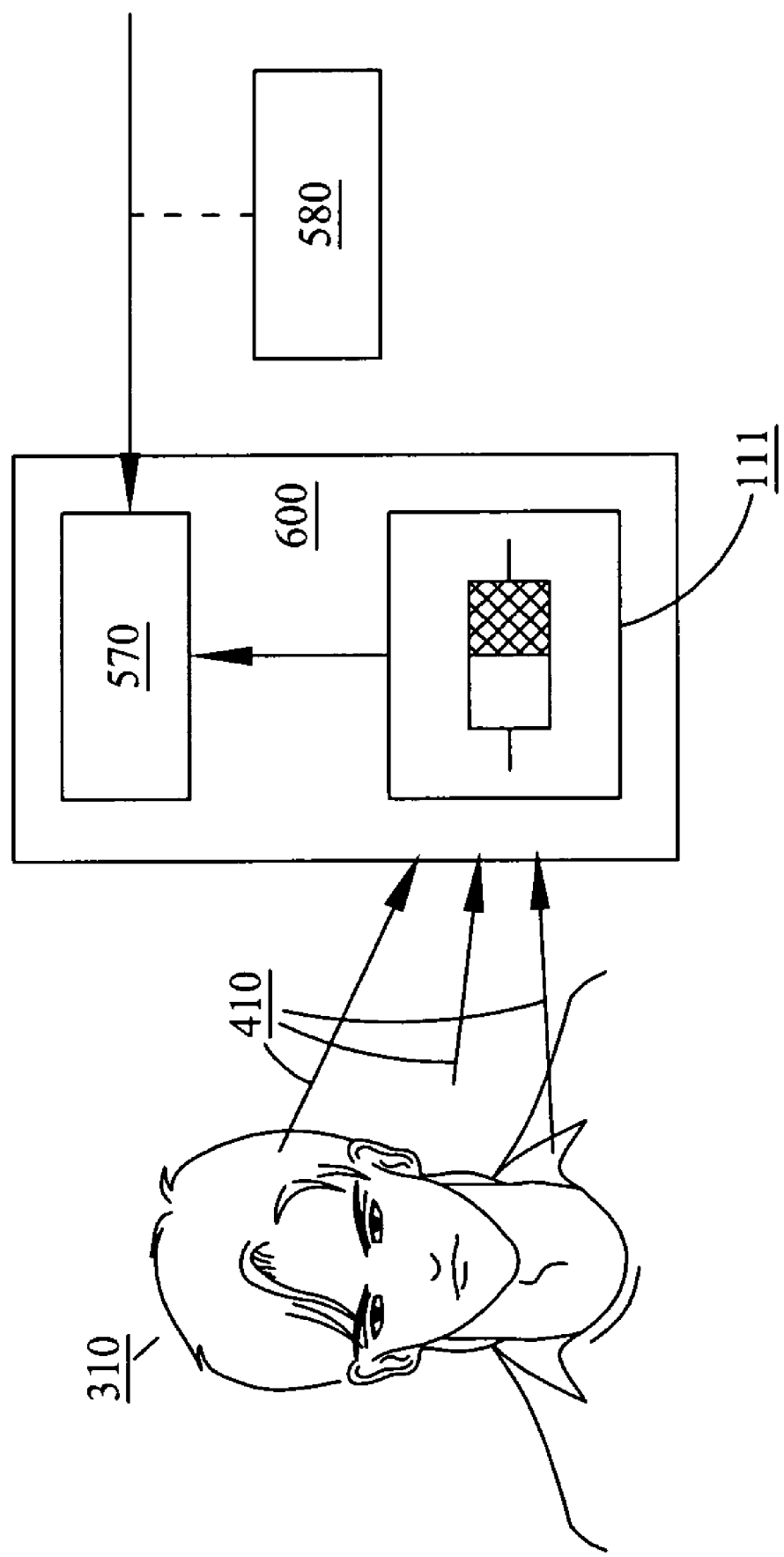
FIG. 8 is an operational view of a preferred embodiment of a photosensitive circuit in accordance with the present invention.

Referring to FIG. 8 for an operational view of a preferred embodiment of a photosensitive circuit in accordance with the present invention, the photosensitive circuit 500 is installed inside a cell phone 600. The cell phone 600 can uses the photoelectric semiconductor 111 to detect the variation of the received light 410. When the user 310 picks up the cell phone 600 and moves close to his/her ears, the photosensitive circuit can detect that the received light 410 becomes stronger due to the increasing of the intensity of reflective light 220. Therefore, when the cell phone 600 receives a calling signal 580, it may vibrate or ring to notify the user 310. At the mean time, when the cell phone 600 receives the calling signal 580, if the photosensitive circuit 500 detects that the user 310 picks up the cell phone 600 and moves close to ears, the photosensitive circuit 500 can generate a trigger signal to enable the processor 570 to receive automatically the calling. The user 310 can receive the call by just picking up the cell phone 600 and moving close his/her ears, and without pushing any bottom. In other words, the photosensitive circuit in accordance with the present invention is capable of generating a trigger signal to accept the calling 580 when the photoelectric semiconductor 111 detects the variation of the received light 410.

Figure 9:
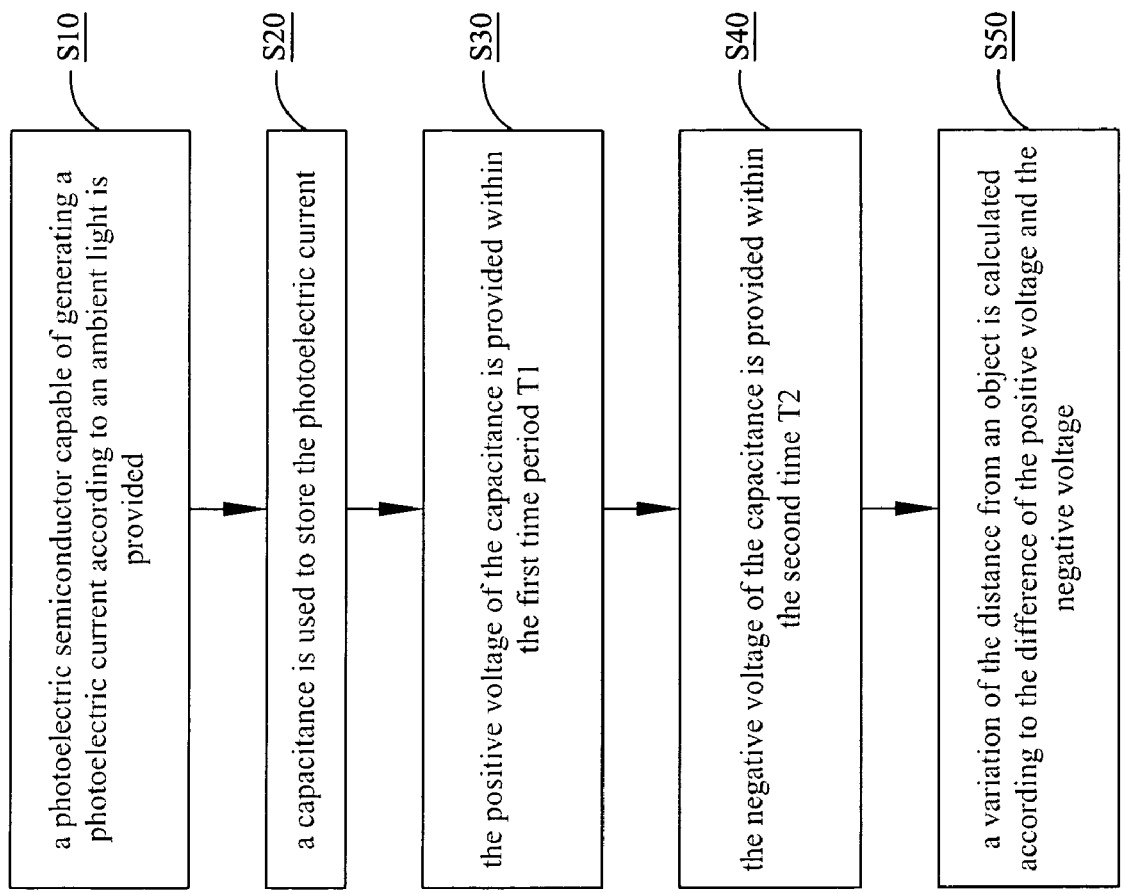
FIG. 9 is the steps flowchart of a preferred embodiment of a photosensitive method in accordance with the present invention.

FIG. 9 illustrates a flow chart of a preferred embodiment of a photo sensing method in accordance with the present invention. The method comprises the following steps. In the step S10, a photoelectric semiconductor capable of generating a photoelectric current according to an ambient light is provided. In the step S20 a capacitance is used to store the photoelectric current, so that the capacitance is charged to generate a voltage. Next, in the step S30 the positive voltage of the capacitance is provided within the first time period T1, and in step S40 the negative voltage of the capacitance is provided within the second time T2. In step S50, a variation of the distance from an object is calculated according to the difference of the positive voltage and the negative voltage.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A photosensitive circuit for detecting an object, comprising:
   a photosensitivity unit capable of receiving an ambient light;
   a capacitance capable of storing a photoelectric current generated by said photosensitivity unit according to said ambient light;
   a comparison unit; and
   a switch unit capable of respectively providing positive voltage of said capacitance to said comparison unit at a first time period and a negative voltage of said capacitance to said comparison unit at a second time period;
   wherein, said comparison unit outputs a detection value according to said positive voltage and said negative voltage, and said detection value is related to the distance between said object and said photosensitive circuit.

2. The photosensitive circuit of claim 1, further comprising a latch unit to store said detection value.

3. The photosensitive circuit of claim 1, wherein said photosensitivity unit is a photoelectric semiconductor, and leak current of said photoelectric semiconductor is related to the intensity of said ambient light.

4. The photosensitive circuit of claim 1, wherein said switch unit stops to provide said negative voltage of said capacitance to said comparison unit at said second time period when the intensity of said ambient light is too strong to cause said photoelectric current larger than a threshold value for said capacitance.

5. The photosensitive circuit of claim 1, wherein said switch unit switches the polarity of said capacitance for generating a plurality of short-period first time period and second time period when the intensity of said ambient light is too strong to cause said photoelectric current larger than a threshold value for said capacitance.

6. The photosensitive circuit of claim 1, wherein said photosensitive circuit resets the voltage value of said capacitance for making said capacitance be able to tolerance said photoelectric current when said ambient light is too strong to cause said photoelectric current larger than a threshold value for said capacitance.

* * * * *